United States Patent
Doumuki

(10) Patent No.: US 7,822,866 B2
(45) Date of Patent: Oct. 26, 2010

(54) METHOD AND SYSTEM FOR RETRIEVING CONTENT IN NETWORK SYSTEM

(75) Inventor: Tohru Doumuki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 480 days.

(21) Appl. No.: 11/044,317

(22) Filed: Jan. 27, 2005

(65) Prior Publication Data
US 2006/0179048 A1 Aug. 10, 2006

(51) Int. Cl.
*G06F 15/16* (2006.01)
(52) U.S. Cl. ................... 709/231; 707/823; 707/824; 707/827
(58) Field of Classification Search ............ 707/1; 711/111, 115, 4, 5, 103; 709/219, 202, 203, 709/206, 217, 246, 238; 369/30, 24, 83, 369/84, 36
See application file for complete search history.

(56) References Cited

U.S. PATENT DOCUMENTS

| | | | | |
|---|---|---|---|---|
| 5,581,740 | A * | 12/1996 | Jones | 703/25 |
| 5,721,951 | A * | 2/1998 | DorEl | 710/10 |
| 6,226,672 | B1 * | 5/2001 | DeMartin et al. | 709/219 |
| 6,367,019 | B1 * | 4/2002 | Ansell et al. | 726/26 |
| 6,581,160 | B1 * | 6/2003 | Harada et al. | 713/169 |
| 6,594,740 | B1 * | 7/2003 | Fukuda | 711/156 |
| 6,832,293 | B1 * | 12/2004 | Tagawa et al. | 711/115 |
| 7,295,994 | B2 * | 11/2007 | Yoshida et al. | 705/26 |
| 7,640,320 | B2 * | 12/2009 | Madison et al. | 709/219 |
| 2001/0032071 | A1 * | 10/2001 | Burchard et al. | 704/200.1 |
| 2001/0053944 | A1 * | 12/2001 | Marks et al. | 700/94 |
| 2002/0013852 | A1 * | 1/2002 | Janik | 709/231 |
| 2002/0021806 | A1 * | 2/2002 | Nara et al. | 380/201 |
| 2002/0035599 | A1 * | 3/2002 | Matsumoto et al. | 709/203 |
| 2002/0069127 | A1 * | 6/2002 | Enari | 705/26 |
| 2002/0129036 | A1 * | 9/2002 | Ho Yuen Lok et al. | 707/104.1 |
| 2002/0138165 | A1 * | 9/2002 | Lord et al. | 700/94 |
| 2002/0152278 | A1 * | 10/2002 | Pontenzone et al. | 709/217 |

(Continued)

FOREIGN PATENT DOCUMENTS

WO    WO 2005/045694    *    5/2005

OTHER PUBLICATIONS

Microsoft Press, Computer Dictionary, 3rd Edition, p. 285. 1997.*

*Primary Examiner*—Cheyne D Ly
(74) *Attorney, Agent, or Firm*—John L. Rogitz

(57) ABSTRACT

A home entertainment network includes at least one client device connected to a server over a network, and the client has an interface to removable media. Each piece of removable media has a unique ID, which can be pre-recorded beforehand or assigned by a server. A user selects content from a library in the server(s) and associates it with the ID of a piece of media through the server or client, with the server storing the media ID as well as information to identify the associated content. Unlike a conventional removable media system, however, no content data is on the media. To play back the content, a user simply engages the media with a client device, which retrieves the media ID, sends it to the server, and receives in exchange from the server the associated content.

11 Claims, 2 Drawing Sheets

U.S. PATENT DOCUMENTS

| | | | |
|---|---|---|---|
| 2002/0167489 A1* | 11/2002 | Davis | 345/157 |
| 2004/0064518 A1* | 4/2004 | Almstrand et al. | 709/208 |
| 2005/0044574 A1* | 2/2005 | Lau et al. | 725/91 |
| 2007/0159934 A1* | 7/2007 | Weon | 369/30.06 |

* cited by examiner

METHOD AND SYSTEM FOR RETRIEVING CONTENT IN NETWORK SYSTEM

FIELD OF THE INVENTION

The present invention relates generally to providing content in a home network.

BACKGROUND

Providing systems that enable users to enjoy audio/visual content regardless of time and place has been a universal goal in the consumer electronics industry for many years. The most conventional approach is to use some type of removable media on which content is stored, and a user can play the content back at any place where a compatible player is available. These removable media include magnetic tape cassettes, optical discs such as CDs and DVDs, and semiconductor memories. This approach has the advantage of being intuitive and straightforward, and most users are already familiar with it.

Recent technical developments, however, are raising some issues with the approach of providing content on removable media. One relates to the expanding volume of data. As the range of content and its data volume increases, greater capacity is required for media, and the time to transfer content onto the media tends to increase. To overcome this problem, new types of media are regularly introduced, but this renders older formats (and their players) obsolete.

Another issue is digital rights management. Since digitized data is easily copied without degradation, elaborate technology is required to prevent unlimited copies from being made.

The present invention recognizes that content provision systems that do not use removable media, such as networks, are also in widespread use and avoid some of the problems noted above. Specifically, in a networked system, a user can retrieve content that is stored in a remote device, have it transferred to another device, and play it back remotely. The user is not forced to copy the content to removable media or to buy removable media. The advantage to networks is that the number of servers and clients is flexible, and a user can access any content in a server from any client in the same network without using removable media.

As further understood herein, however, networks such as home networks are not without their own peculiar drawbacks. For instance, in a household that shares the same server(s) storing a wide variety of content for each family member, when one user wishes to use part of the library, he must obtain a list of the content and then select the desired content. Because it would be inconvenient to go through this process every time, a user may create some sort of "user account" or "category holder" and associate favorite content beforehand, and the groupings are stored in the server. In a client device sought to be used as a player, the user can input the account or holder name to access the data in the server, or search it using a graphical user interface. The user may also input a password, because access to some content must be limited due to parental control, etc.

The present invention critically recognizes that in such networks, the client device (player) must have a user interface such as a keyboard and display so that the user can see a list of the content, confirm choices, and input an account name or password. This kind of approach is reminiscent of a computer network system, in which keyboards and monitors are common and users are presumed to be familiar with such computer-oriented operations, but in consumer electronic systems, such a presumption is not always valid. Accordingly, a networked system such as the type discussed above may not be not perceived to be user-friendly for all the family members.

Moreover, privacy protection and access control can be problematic in networked systems, because the range of the signal may not be limited to within the user's immediate area, thus potentially being captured by an eavesdropper. The content stream can of course be scrambled or encrypted before it is output, but this typically requires delivery of an encryption key, which typically is input manually into at least some of the system client devices and, thus, again implicates computer skills. Thus, the current PC-like approach in consumer electronic network systems often spoils the ease of use for many users, who nonetheless remain familiar with the intuitive solution of removable media, in which access to content is limited simply to those who actually possess the media. Having made these critical observations, the invention herein is provided.

SUMMARY OF THE INVENTION

A network includes one or more client devices and at least one server storing audio/video content and communicating with the client device over a network link. The client device includes an interface engageable with a removable data storage medium that bears a unique media ID but not necessarily any substantial A/V content, at least not beyond thumbnails or visual content indices. However, the media ID is associated with content in the server. The content can be selected for play on the client device when a user engages the medium with the interface to cause the client device to send the media ID to the server. The server, in response, sends content associated with the media ID to the client device for playing of the content.

In some implementations the server displays a list of content associated with the removable data storage medium for selection of content by a user. An indicator light can be provided on the client device indicating whether a server can supply content associated with the removable data storage medium. The removable data storage medium may if desired include an encryption key useful for decrypting content received from the server. Among the ways to write the media ID onto the medium, the removable data storage medium can be engaged with the server to write the media ID onto the removable data storage medium. With this invention, the removable data storage medium need not stores audio/video content.

In another aspect, a home entertainment system includes at least one server, at least one client device capable of playing entertainment content, and at least one portable medium removably engaged with the client device but substantially not bearing the entertainment video content sought to be played, although some minor content such as still thumbnails or other visual content index might be on the portable medium. The client device reads a media ID on the portable medium and sends the ID to the server over a network link for correlation of the ID to content sought to be played.

In yet another aspect, a method for making audio/video (A/V) content available to a client device distanced from the A/V content by at least one network link includes engaging a removable data storage device with a removable data storage device interface in the client device. The method then includes reading information on the removable data storage device, the information not being A/V content, and sending the information over the link to a source of A/V content. Using the information, A/V content is provided to the client device over the link.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
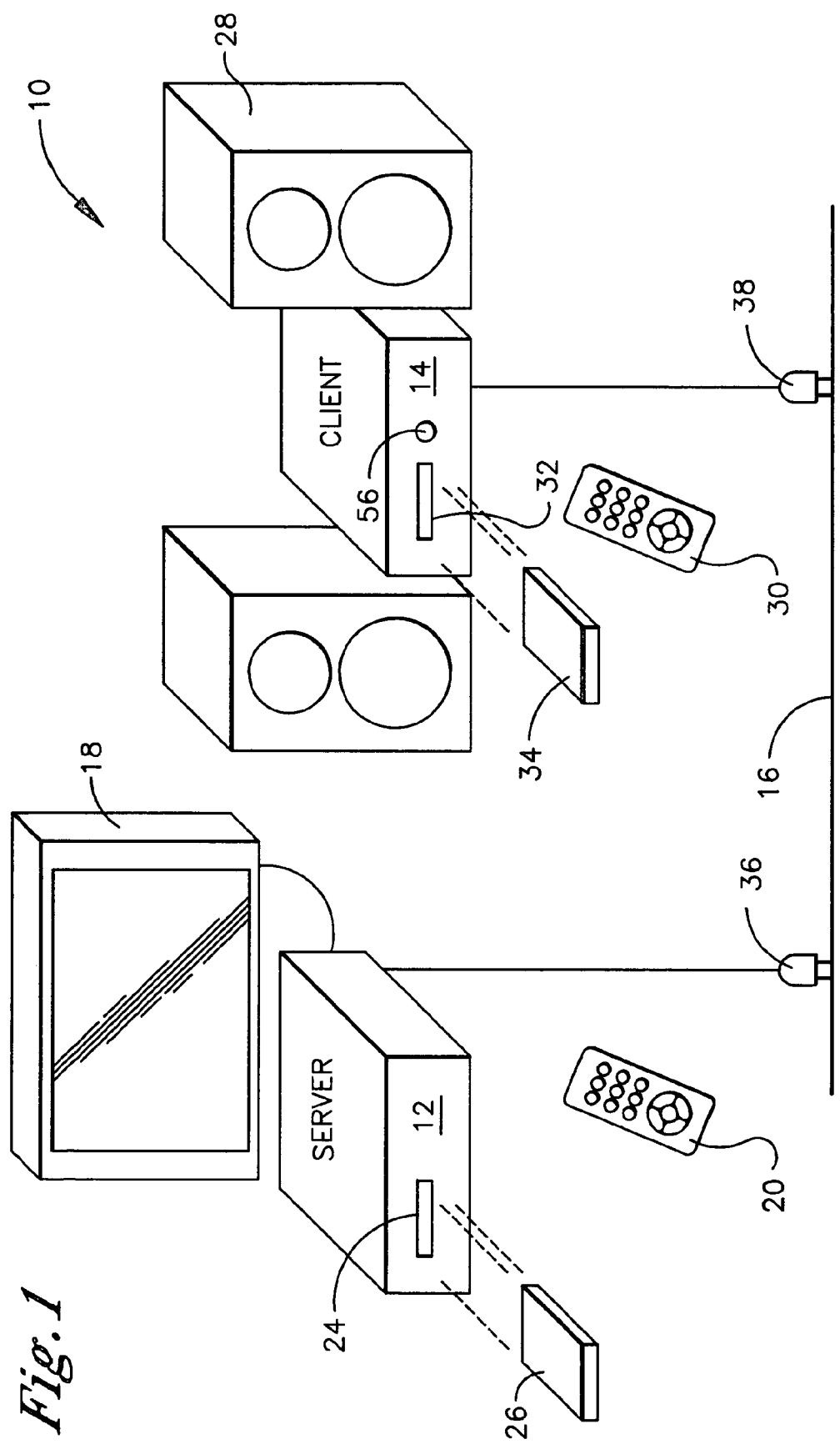
FIG. 1 is a block diagram of the present system.

Referring initially to FIG. 1, a home entertainment or other content provision network is shown, generally designated 10, which includes at least one server 12 communicating with one or more client devices 14 over one or more network links 16. The server 12 can store content such as movies, televised content, and other audio/video content and/or can receive broadcast programs. The client device 14 is capable of playing the content for viewing and/or listening.

The server 12 may be implemented by any appropriate computer, e.g., a PC, laptop, mainframe, etc. that includes data storage such as optical or magnetic disks on which A/V content can be stored. The server 12 may also include a TV receiver and/or set-top box for receiving broadcast content. If desired, the server 12 may include a display 18 and may be wirelessly controlled using a hand-held remote commander 20 that advantageously can be a conventional home entertainment system or TV remote control device. Further, in some embodiments the server 12 can have a slot or other removable memory interface 24 that can removably receive a removable, preferably portable memory medium 26. The client device 14 may also have displays such as video monitors, audio speakers 28, etc. and may be controlled by the same or a different remote commander 30. Thus, the client device may be a stereo system, TV, etc. In any case, the present client device 14 has an interface 32 that can removably receive a removable memory medium 34. The media 26, 34 can be interchangeable with each other.

The network link 16 may be wired or wireless. Although the present invention is independent of the type of network technology, power line (PLC) network links can be used, e.g., respective power plugs 36, 38 of the server 12 and client device 14 may be not only sources of electrical power, but also paths for content streams so that the A/V content is transmitted through the power line. However, as mentioned above other networks can be used, e.g., Ethernet, 802.11, rf or IR wireless networks, portions of the Internet, etc.

Figure 2:
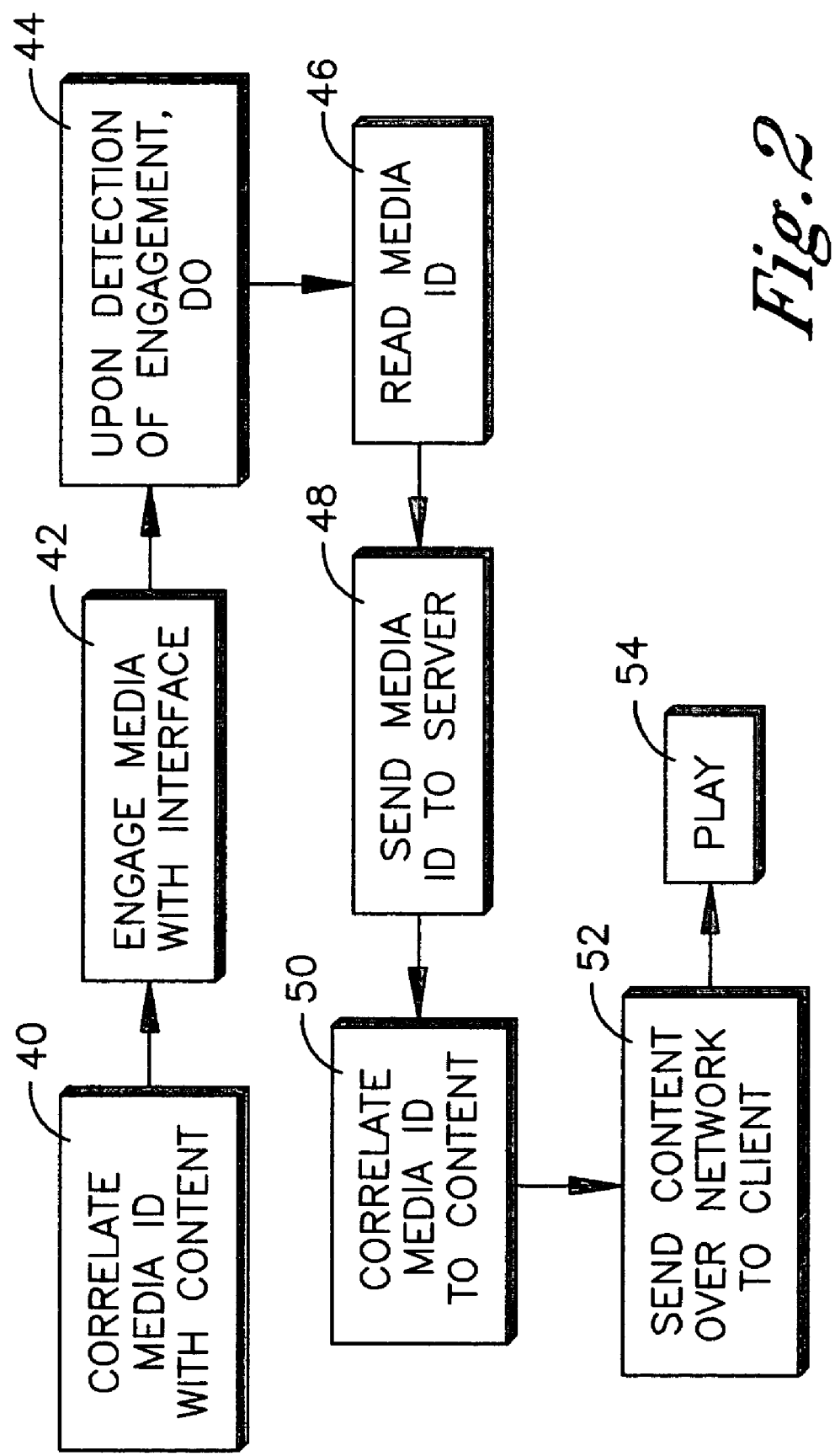
FIG. 2 is a flow chart of the present logic.

FIG. 2 shows the logic behind the present invention, one or more steps of which may be implemented by the devices shown in FIG. 1. At block 40, a media identification (ID) is correlated to content available to the server 12. In the present invention, however, substantially no actual content data need be transferred or written to the removable media disclosed herein, although it may contain some de minimis content such as, e.g., thumbnails or other visual indices of content in the server.

Instead, each removable medium is assigned a unique media ID that is so correlated, with the media ID being carried on the medium. This can be done at time of manufacture or later, by inserting a blank medium into the interface of the server 12 and causing the server 12 to store on the medium its identification. The correlation of media IDs to content likewise can be accomplished in any number of ways, both by the end user and/or by the vendor. When the media ID is written by the server 12, the user can manipulate an input device on the server 12 to associate content in the network 10 (e.g., content that is stored on the server 12 or on another server) with the media ID, although as stated above the media ID may be correlated at time of manufacture with content and the content subsequently downloaded or otherwise made available to the network 10.

When a user wishes to play content associated with a removable medium, he engages the medium with the interface 32 of the client device 14 at block 42, which automatically detects the engagement at block 44 to automatically commence the process at block 46 of reading the media ID from the medium. Instead of or in lieu of automatic detection, a user could manipulate a button or other control element on the client device 14. At block 48, the client device 14 sends the media ID to the server 12, which uses the media ID to look up the correlated content at block 50. When the network 10 has plural servers, the media ID can be sent over the network to all the servers, with the server storing the correlated content then executing the below logic.

One or more A/V titles may be correlated to the media ID, so if desired the server display 18 shown in FIG. 1 can display a list of available content that is correlated to the media ID. Or, the list can be sent to the client device 14 for display thereon. In either case, the user can manipulate one or both of the remote commanders 20, 30 to select content for display, with the content then being sent from the server 12 to the client device 14 over the network at block 52 for play at the client device 14 at block 54 in accordance with commands from the remote commander 30, e.g., play, stop, pause, rewind, etc. In any case, other than operating the familiar remote commander to play content, it may now be appreciated that the user need not do anything further to make the content available on the client device 14 beyond inserting the removable medium 34 into the interface 32.

In some embodiments the server 12 may send an acknowledgement to the client device 14 prior to providing content that the corresponding server is available and ready to supply content. One convenient way to do this is to illuminate (in, e.g., yellow) an indicator light 56 (FIG. 1) on the client device 14 when the medium 34 is inserted and then illuminate (in, e.g., green) the light 56 when the corresponding server is found available on the network. More generally, the light 56 can indicate the status of access to A/V content on the server and/or the status of access to the removable data storage medium.

For identification of the content, the server 12 can use the file names of the content, addresses in the file system, or any type of identification. Because only a small storage capacity is required in the removable media 26, 34, memory size of the media 26, 34 can be less than a few thousand bytes. Also, once the media ID is read by a client device and stored by the client device or server, the user may remove the removable media from the interface.

It may now be appreciated that with the system described above, no user name or password is required to access network content. Instead, the media 26/34 are used like conventional DVDs, but without necessarily storing any substantial video content apart from (as a non-limiting option) the above-mentioned thumbnails. Simply inserting the appropriate medium enables access to the corresponding content. Thus, the system is free from issues such as increasing data capacity, copying/dubbing time, or uncontrolled copying of digital rights-managed content.

To enhance the user experience, a server 12 may send additional information regarding the associated content when the removable medium 34 is inserted. This information may include list of the associated content as mentioned above, and/or thumbnails in the case of visual content. In some applications, such information may be stored in the removable medium during the association process.

Another advantage of some implementations of the invention can be privacy protection and access limitation. In addition to the media ID, an encryption key can also be stored on the removable medium 34. The key can be used to decrypt data that may have been encrypted by the server 12 for greater security. Any type of encryption algorithm can be used.

While it is contemplated that the removable media 26, 34 can be, e.g., stick-like media such as the present assignee's Memory Stick, other types of media can be used, including magnetic and optical storage media, and other semiconductor memory cards. The removable media can be read-only, with media ID pre-installed, or write-once or rewritable to facilitate the server 12 writing the media ID (and if desired encryption keys) onto the removable media. In some non-limiting implementations, the removable medium can be a cassette or diskette with an IC chip or other memory attached, with the ID being written to the chip or other memory or to the cassette/diskette.

As set forth above, a user can insert a removable medium 26, 34 into a server 12 and complete the association process through the same server, but this is not mandatory. The correlating server can be different from the server on which the content actually is stored. Necessary information is exchanged via the network in those cases. Furthermore, one removable medium may be associated with content in multiple servers. The present system may coexist with conventional removable media, or a conventional network, i.e., the server and/or the client may also function as conventional network devices or as removable media recorders or players. For example, a removable medium may also store content data as in the conventional manner.

While the particular METHOD AND SYSTEM FOR RETRIEVING CONTENT IN NETWORK SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A network comprising: at least one client device; and at least one server storing audio/visual content and communicating with the client device over at least one network link, wherein the client device includes at least one client interface physically engageable with a removable data storage medium bearing a unique media ID associated with content in the server, wherein the removable data storage medium stores information consisting of the media ID in combination with thumbnails or other visual indices of the content in the server, wherein responsive to a user physically engaging the removable data storage medium with the client interface the client device sends the media ID to the server, wherein the server in response correlates correlating the content to the media ID and sends the correlated content over the network link to the client device to play the content by the client device, wherein the user need not do anything further to play the content on the client device beyond inserting the portable medium into the client device, further comprising at least one indicator light on the client device non-alpha-numerically indicating status of access to the content on the server and/or status of access to the removable data storage medium, wherein the server includes at least one server interface, the removable data storage medium being physically engageable with the server interface to write the media ID onto the removable data storage medium.

2. The network of claim 1, wherein a display associated with the server displays a list of content associated with the removable data storage medium for selection of content by a user.

3. The network of claim 1, wherein the removable data storage medium includes at least one encryption key useful for decrypting content received from the server.

4. The network of claim 1, wherein the removable data storage medium is a semiconductor memory card.

5. A home entertainment system, comprising:
at least one server;
at least one remote commander manipulable by a user to send wireless commands;
at least one client device capable of receiving the wireless commands and playing entertainment content; and
at least one portable medium storing information consisting of a media ID in combination with thumbnails or other indices of the content in the server, removably physically engageable with the client device, wherein responsive to a user physically engaging the removable data storage medium with the client interface, the client device sends the media ID to the server, wherein the server in response correlates the content to the media ID and sends the correlated content in a list over the network link to the client device for playing of the content at the client device, wherein the client device displays the list, whereby a user can manipulate the remote commander to select one of the content pieces for the list, with the content then being sent responsive to a user command from the remote commander from the server to the client device over the network link for play at the client device in accordance with commands from the remote commander, the commands being selected from the group of commands including play, stop, pause, rewind, wherein other than operating the remote commander to play content, a user need not do anything further to play the content on the client device beyond inserting the portable medium into the client device, the client device including at least one indicator light non-alpha-numerically indicating status of access to the content on the server and/or status of access to the removable data storage medium.

6. The system of claim 5, wherein the portable medium includes at least one encryption key useful for decrypting content received from the server.

7. The system of claim 5, wherein the portable medium is engageable with the server to write the media ID onto the portable medium.

8. The system of claim 5, wherein the portable medium is a semiconductor memory card.

9. A method for making audio/video (A/V) content in a server available to a client device distanced from the A/V content by at least one network link, the method being implemented using at least one server, at least one remote commander manipulable by a user to send wireless commands, at least one client device capable of receiving the wireless commands and playing entertainment content, and at least one portable medium physically engageable with the client device, wherein the portable medium stores information consisting of a media ID in combination with thumbnails or other visual indices of the content in the server, the method comprising:

responsive to a user physically engaging the removable data storage device with a removable data storage device interface in the client device causing the client device to send the media ID to the server, wherein the server in response correlates the content to the media ID and sends the correlated content in a list over a network link to the client device for playing of the content by the client device, wherein the client device displays the list whereby a user manipulating the remote commander to select one of the content pieces from the list generates a select signal, wherein responsive to the select signal the content is sent from the server to the client device over the link for play at the client device in accordance with commands from the remote commander, the commands being selected from the group of commands including play, stop, pause, rewind, wherein other than operating the remote commander to play content, a user need not do anything further to play the content on the client device beyond inserting the removable data storage device into the client device, the client device including at least one indicator light non-alpha-numerically indicating status of access to A/V content on the server and/or status of access to the removable data storage device.

10. The method of claim 9, comprising storing on the removable data storage medium at least one encryption key useful for decrypting content.

11. The method of claim 9, wherein the removable data storage medium is a semiconductor memory card.

* * * * *